Patented Oct. 21, 1952

2,615,039

UNITED STATES PATENT OFFICE 2,615,039

AMIDOTHIOPHOSPHATES

Lewis R. Drake, Midland, Mich., assignor to The Dow Chemical Company, Midland, Mich., a corporation of Delaware No Drawing. Application November 2, 1949, Serial No. 125,160

3 Claims. (Cl. 260—461)

This invention is directed to the amidothiophosphates having the formula

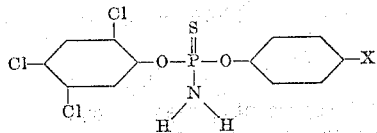

wherein X represents a member of the group consisting of bromine and chlorine.

The amidothiophosphate products of the present invention are viscous oils, substantially insoluble in water, and somewhat soluble in many organic solvents. They are of value as toxic constituents of insecticidal and fungicidal compositions.

The new products may be prepared by (1) reacting O-(2,4,5-trichlorophenyl) dichlorothiophosphate having the formula

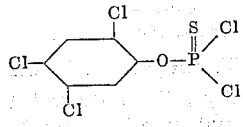

with not more than an equimolecular proportion of 4-bromo- or 4-chlorophenol and (2) reacting the resulting intermediate product with ammonia.

In carrying out the above reaction, 1 molecular proportion of 4-bromophenol or 4-chlorophenol is dissolved in at least 1 molecular proportion of pyridine and the resulting solution added portionwise to at least 1 molecular proportion of O-(2,4,5-trichlorophenyl) dichlorothiophosphate dissolved in benzene, methylene dichloride, or other suitable organic solvent. The reaction is carried out with stirring and at a temperature of from 25° to 100° C. In practice, it is sometimes convenient to operate at the boiling temperature of the reaction mixture and under reflux.

In the second phase of the reaction, the intermediate product is reacted with an excess of ammonia, either by adding the O-(2,4,5-trichlorophenyl) O-(halophenyl) chlorothiophosphate to an excess of liquid ammonia or by exhaustively passing anhydrous gaseous ammonia through the intermediate dissolved in benzene or other solvent. In this operation, a large excess of ammonia is employed to provide for the reaction of by-product hydrogen chloride to form ammonium chloride. If desired, pyridine hydrochloride made be separated from the intermediate prior to reaction with ammonia.

The crude amidothiophosphate products as obtained in the practice of the foregoing reactions have utility without further modification as constituents of parasiticidal mixtures. However, some purification is frequently desirable. Thus, the excess ammonia may be evaporated out of the crude reaction mixture at room temperature, the resulting crude product filtered, and the filtrate successively washed with dilute alkali, dilute acid and water to separate traces of reactants and by-product hydrochlorides.

O - (2,4,5 - trichlorophenyl) dichlorothiophosphate employed as a starting material, as above described, may be prepared by reacting 2,4,5-trichlorophenol with thiophosphoryl chloride (PSCl₃) in a molecular excess of pyridine. In carrying out the reaction, one molecular proportion of 2,4,5-trichlorophenol is dissolved in at least one molecular proportion of pyridine and the resulting solution added portionwise to one molecular proportion of thiophosphoryl chloride. The addition is carried out with stirring and at a temperature of from 25° to 100° C. In practice, it is sometimes convenient to operate at the boiling temperature of the reaction mixture and under reflux. A mixture of pyridine and an inert solvent such as methylene dichloride may be substituted for the excess pyridine, provided only that at least one molecular proportion of pyridine be present for each molecular proportion of 2,4,5-trichlorophenol present in the mixture. Upon completion of the reaction, the crude mixture is fractionally distilled under reduced pressure to obtain the O-(2,4,5-trichlorophenyl) dichlorothiophosphate. The latter has a boiling point of 110° C. at 1 millimeter pressure, a density of 1.6653 at 20° C., and a refractive index n/D of 1.6084 at 20° C.

This application is a continuation of a copending application, Serial No. 94,250, filed May 19, 1949.

The following examples illustrate the invention but are not to be construed as limiting:

*Example 1.—O-(2,4,5-trichlorophenyl) O-(4-chlorophenyl) amidothiophosphate*

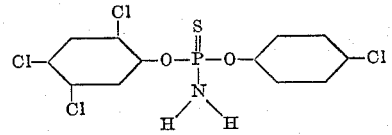

13 grams (0.1 mol) of 4-chlorophenol and 7.8 grams (0.1 mol) of pyridine were mixed with 33 grams (0.1 mol) of 2,4,5-trichlorophenyl dichlorothiophosphate dissolved in 50 milliliters of methylene dichloride. The resulting solution was heated for 16 hours at 50° to 55° C., and under reflux. A molecular excess of gaseous ammonia was then introduced into and through the resulting mixture, the addition being carried out at temperatures gradually increasing from 25° to 45° C. The excess ammonia was then evaporated off over a period of 16 hours at room temperature. The resulting crude product was filtered to remove by-product ammonium chloride, and the filtrate successively washed with dilute aqueous sodium hydroxide, dilute aqueous hydrochloric acid and water, and dried over anhydrous sodium sulfate. The solvent was then evaporated out of the mixture to obtain an O-(2,4,5-trichlorophenyl) O-(4-chlorophenyl) amidothiophosphate product as a yellow oil. The latter had a density of 1.685 at 22° C., and a refractive index $n/D$ of 1.5985 at 35° C.

*Example 2. — O-(2,4,5 - trichlorophenyl) O-(4-bromophenyl) amidothiophosphate*

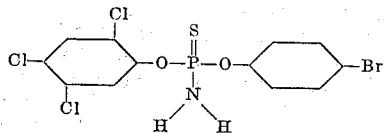

In a similar manner, 17.3 grams (0.1 mol) of 4-bromophenol, 7.8 grams (0.1 mol) of pyridine, 33 grams (0.1 mol) of O-(2,4,5-trichlorophenyl) dichlorothiophosphate, and 50 milliliters of methylene dichloride were mixed together and heated for 16 hours at 50° to 55° C., and under reflux. The subsequent reaction of the resulting intermediate with a molecular excess of gaseous ammonia, and the filtration, washing and drying steps were all as previously described. Upon evaporation of the methylene dichloride, there was obtained and O-(2,4,5-trichlorophenyl) O-(4-bromophenyl) amidothiophosphate as a yellow oil having a density of 1.715 at 22° C., and a refractive index $n/D$ of 1.6062 at 35° C.

These new amidothiophosphate products have been found effective as insecticides and fungicides, and are adapted to be employed for the control of agricultural pests. In representative operations, the products of the preceding examples have been tested for the control of two-spotted spider mite, bean aphid, Mexican bean beetle, and Southern army worm. Against these organisms, 100 per cent kills have been obtained with aqueous spray compositions containing from 0.25 to 3 pounds of toxicant per 100 gallons. By such expression, applicant means that against one or more of the named organisms, complete controls have been obtained with each toxicant when employed in aqueous spray compositions at a concentration within the range of from 0.25 to 3 pounds per 100 gallons of spray mixture. Such spray mixtures have contained the new products in combination with representative wetting and emulsifying agents.

I claim:

1. An amidothiophosphate having the formula

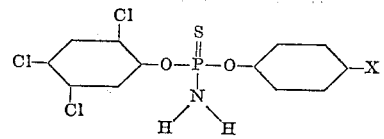

wherein X represents a member of the group consisting of bromine and chlorine.

2. O-(2,4,5-trichlorophenyl) O-(4-chlorophenyl) amidothiophosphate.

3. O-(2,4,5-trichlorophenyl) O-(4-bromophenyl) amidothiophosphate.

LEWIS R. DRAKE.

REFERENCES CITED

The following references are of record in the file of this patent:

FOREIGN PATENTS

| Number | Country | Date |
|---|---|---|
| 500,386 | Great Britain | Feb. 8, 1939 |

OTHER REFERENCES

Autenrieth et al., Berichte, vol. 31 (1898) only pp. 1090 and 1109 (of article pp. 1094–1109).